(12) United States Patent
Metz et al.

(10) Patent No.: US 8,021,716 B2
(45) Date of Patent: Sep. 20, 2011

(54) POLYELECTROLYTE-ENCAPSULATED PIGMENTS

(75) Inventors: Hans Joachim Metz, Frankfurt am Main (DE); Carsten Plueg, Seeheim-Jugenheim/Ober-Beerbach (DE); Gerald Mehltretter, Wiesbaden (DE); Karl-Heinz Schweikart, Eschborn (DE); Andreas Voigt, Berlin (DE); Lars Daehne, Berlin (DE); Lutz Kroehne, Berlin (DE); Jan Moeschwitzer, Berlin (DE)

(73) Assignee: Clariant Finance (BVI) Limited, Tortola (VG)

( * ) Notice: Subject to any disclaimer, the term of this patent is extended or adjusted under 35 U.S.C. 154(b) by 90 days.

(21) Appl. No.: 11/717,989

(22) Filed: Mar. 14, 2007

(65) Prior Publication Data
US 2007/0224345 A1   Sep. 27, 2007

(30) Foreign Application Priority Data

Mar. 15, 2006   (EP) .................................... 06005240

(51) Int. Cl.
*B32B 5/66* (2006.01)
(52) U.S. Cl. ................. 427/213.3; 427/213.37; 427/214; 428/403; 428/407
(58) Field of Classification Search .......... 428/403–407; 427/213.3, 213.31, 214
See application file for complete search history.

(56) References Cited

U.S. PATENT DOCUMENTS

| | | | |
|---|---|---|---|
| 6,479,146 B1 | 11/2002 | Caruso et al. | |
| 6,479,569 B2 | 11/2002 | Jung et al. | |
| 6,485,558 B1 | 11/2002 | Metz et al. | |
| 6,699,501 B1 | 3/2004 | Neu et al. | |
| 7,029,818 B2 | 4/2006 | Rohr et al. | |
| 7,101,575 B2 | 9/2006 | Donath et al. | |
| 2003/0219384 A1 | 11/2003 | Donath et al. | |
| 2004/0143040 A1 | 7/2004 | Metz et al. | |
| 2004/0229974 A1 | 11/2004 | Miyabayashi | |
| 2006/0275373 A1 | 12/2006 | Donath et al. | |
| 2006/0275374 A1 | 12/2006 | Donath et al. | |
| 2006/0275375 A1 | 12/2006 | Donath et al. | |

FOREIGN PATENT DOCUMENTS

| | | |
|---|---|---|
| EP | 0058865 | 9/1982 |
| EP | 0972563 | 1/2000 |
| EP | 1589077 | 10/2005 |
| GB | 955283 | 4/1964 |
| WO | WO 99/47252 | 9/1999 |
| WO | WO 02/28660 | 4/2002 |
| WO | WO02/28660 A2 * | 4/2002 |
| WO | WO 2006/066131 | 6/2006 |

OTHER PUBLICATIONS

Junjie Yuan et al, "Organic pigment particles coated . . . " Chem. Mater. 2005, 17, 3587-3594.*
Junjie Yuan et al, "organic pigment particles coated . . . " Chem. Mater. 2005,17,3587-3594.*
Co-pending U.S. Appl. No. 11/587,879, by Ganschow et al., filed Oct. 26, 2006.
EPO Search Report for EP 06005240, mailed Mar. 1, 2007.
Yuan et al. "Organic Pigment Particles with Colloidal Nano-Silica Particles via Layer by Layer Assembly," Chemistry of Materials, American Chemical Society Bd. 17 Nr. 14, pp. 3587-3594 (2005).
English Abstract for JP 57126857, Aug. 16, 1982.
Bruggen, "Preparation and Properties of Colloical Core-shell Rods with Adjustable Aspect Ratios," Langmuir ACS Bd. 14, Nr. 9, pp. 2245-2255 (Mar. 31, 1998).

* cited by examiner

*Primary Examiner* — Leszek Kiliman
(74) *Attorney, Agent, or Firm* — Anthony A. Bisulca

(57) ABSTRACT

The invention concerns a process for encapsulating pigment particles, which comprises
(A) producing a dispersion of the pigment to be encapsulated,
(B) then applying a polyelectrolyte layer to the surface of the pigment particles,
(C) further applying a polyelectrolyte layer having opposite charge to (B), and/or adding low molecular weight, multivalent ions oppositely charged to (B), and
(D) if appropriate repeating steps (B) and (C),
said steps (B), (C) and if appropriate (D) being carried out in the presence of a nonionic surfactant.

7 Claims, No Drawings

POLYELECTROLYTE-ENCAPSULATED PIGMENTS

The present invention concerns polyelectrolyte-encapsulated pigments, their production and their use as a colorant especially for water- and solvent-based inks and coatings.

The stability of pigment dispersions in solvent-containing and purely aqueous application media such as printing inks, ink jet inks, millbases and coatings is strongly influenced, among other factors, by the surface charge of the pigments used. For many purposes it is desirable that the surface charge be adjusted in a specific manner in order thereby to match the flowability, the wetting behavior, the stability and quality of the dispersion to the respective binder system. A customary way to characterize dispersions of particles is the zeta potential, which is directly linked to the surface charge of the particles and of the charged boundary layer.

Inorganic pigments, having an oxidic or sulfidic structure, usually bear a slightly negative surface charge, which can be changed for example through incorporation of other metal ions in the surface.

The surface charge of organic pigments is usually low and can vary widely with the class of pigment, the substitution pattern and the particular crystal structure. A person skilled in the art knows several ways to vary the surface charge of organic pigments. One way is to use additives which adsorb strongly on the pigment surface and which themselves bear a charge or partial charge. These additives can be polymers having anchor groups which strongly interact with the pigment surface. Alternatively, there are also additives which have a pigment's core structure, which is substituted, and so adhere particularly strongly to the surface of pigments of the particular structural class. The disadvantage with these polymeric and pigment-based additives is that the action of these materials is usually specific to individual pigments or pigment classes and adjustment of the surface charge is only possible within narrow limits. In addition, production of these additives is costly and inconvenient.

A general method of applying polyelectrolytes to certain particles of solid is described in WO 99/47252. This reference, however, is devoid of any indication that the performance characteristics of pigments are improved by such capsulation. True, the reference does mention the encapsulation of dyes, but dyes are soluble colorants whereas pigments are insoluble colorants.

WO 02/28660 describes the coating of particles with polyelectrolyte layers comprising colorants. These materials are expressly described as highly suitable for ink jet inks. But this high suitability is limited to improving the colorants with regard to degradation reactions due to light and other influences. There is no suggestion in this reference whatsoever that pigments have improved properties due to the change in surface charges.

Yuan, J; Zhou, S.; You, B; Lu, L.; Chem. Mat. 2005, 117, 3587-3894 is an account of the coating of Pigment Yellow 109 more than 480 nm in particle size with multicoats of poly(diallyldimethyl)ammonium chloride and sodium poly(4-styrylsulfonate) and subsequent coating with nanoscale silicon dioxide particles.

Particularly in the sector of ink jet printing processes there is a desire for pigment-based ink combinations which combine a brilliant printed image with ease of printing.

Ink jet printing, like for example electrophotography (laser printers and copiers), is a non impact printing process and has become more and more important in recent years owing to the increasing use of computers particularly in the small office, home office (SOHO) sector, but also in the wide format sector.

Ink jet printing technology distinguishes between the so-called continuous printing processes and the drop-on-demand processes, the drops in question being ink drops which are generated by a computer-controlled electric signal. There are basically two kinds of drop-on-demand ink jet processes, namely thermal ink jet, also known as bubble jet, and piezoelectric ink jet.

Pigments have recently come to be increasingly used as colorants in ink jet inks as well as dyes. Pigmented inks for ink jet printing have to meet a whole series of requirements. They have to have a viscosity and surface tension suitable for printing, they have to be stable in storage, i.e., they should not aggregate and the dispersed pigment should not sediment, and they must not lead to clogging of printer nozzles.

Ink jet printing also requires very high standards especially of the color strength, of the hue, the brilliance, the gloss, the transparency and of fastness properties, for example lightfastness, waterfastness and crockfastness, of the prints. Particularly when printing on plain paper, high optical density and good gloss are difficult to achieve. These properties are chiefly determined by the surface charge of the pigment particles used.

Prior art pigments often do not meet ink jet printing requirements. The present invention has for its object to provide surface-charged pigments that meet ink jet printing requirements.

The present invention further has for its object to provide a process for producing surface-modified pigments whereby the surface charge on these particles can be set to specific values. This process should be substantially independent of the class of pigment used.

We have found that this object is achieved, surprisingly, when pigments are encapsulated with polyelectrolyte layers.

The present invention accordingly provides a process for encapsulating pigment particles, which comprises
(A) producing a dispersion of the pigment to be encapsulated,
(B) then applying a polyelectrolyte layer to the surface of the pigment particles,
(C) further applying a polyelectrolyte layer having opposite charge to (B), and/or adding low molecular weight, multivalent ions oppositely charged to (B), and
(D) if appropriate repeating steps (B) and (C),
said steps (B), (C) and if appropriate (D) being carried out in the presence of a nonionic surfactant.

(A): The pigment dispersion used is obtainable by customary methods such as milling, ultrasonic treatment or high pressure homogenization, and advantageously comprises ionic and/or nonionic dispersing and wetting agents.

Examples of nonionic surfactants, which are useful in steps (B), (C) and (D) as well as (A), are alkyl or aryl alkoxylates, for example alkoxylates of castor oil rosin esters, fatty alcohols, fatty amines, fatty acids or fatty acid amides, and also alkoxylation products of alkylphenols, or oligomeric or polymeric derivatives thereof, for example aldehyde condensation products and also alkylpolyglucosides. Also possible are alkoxylates of styrene-phenol addition products such as for example 2,4,6-tris(1-phenylethyl)phenol and also of diglycerol and also polyglycerol esters of long chain acids. It is likewise possible to use amphiphilic polymers or copolymers as dispersing assistants, examples being block-poly(methacrylic ester)-block-poly(ethylene oxide) copolymers, block-polystyrene-block poly(ethylene oxide) copolymers, block-poly(ethylene oxide)-block-poly(propylene oxide) copolymers, block-poly(ethylenediamine)-block-poly(ethylene oxide)-block-poly(propylene oxide) copolymers, polyvinylpyrrolidones or polyvinylalcohols.

Anionic and cationic surfactants are useful as ionic surface-active compounds. Surfactants obtainable by chemical modification of nonionic surfactants are for example compounds having the groups —O—$SO_3H$, —$SO_3H$, —COOH, —O—PO(OH)$_2$, —O—PO(OH)—O—, —O—CO—CH=CH—COOH, —O—COCH($SO_3H$)$CH_2$COOH, —COCH$_2$CH($SO_3H$)COOH. These surfactants are advantageously used in the form of their alkali metal salts, ammonium salts and/or water-soluble amine salts. Besides these it is also possible to use sulfonates of alpha-olefins, sulfonates of polynaphthalenes, ligninsulfonates, dialkyl sulfosuccinates and also sulfated fatty acids or oils and salts thereof. Also useful are cationic surfactants for example from the group of the alkyl- or arylammonium salts, and also zwitterionic surfactants or mesoionic surfactants, such as amine oxides for example.

It is also possible to use polymeric surface-active compounds as dispersants, examples being acrylate resin copolymers having an average molar mass $M_v$ between 1000 and 50 000 g/mol, consisting essentially of monoalkenylaromatics and acrylates. By monoalkenylaromatics are meant in particular monomers from the group consisting of styrene, α-methylstyrene, vinyltoluene, tert-butylstyrene, o-chlorostyrene, and also mixtures thereof.

By acrylates are meant monomers from the group consisting of acrylic acid, methacrylic acid and also esters of acrylic or methacrylic acid. Examples are: methyl methacrylate, ethyl methacrylate, n-propyl methacrylate, n-butyl methacrylate, isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, 2-sulfoethyl methacrylate, trifluoroethyl methacrylate, glycidyl methacrylate, benzyl methacrylate, allyl methacrylate, 2-n-butoxyethyl methacrylate, 2-chloroethyl methacrylate, sec-butyl methacrylate, tert-butyl methacrylate, 2-ethylbutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxybutyl methacrylate, 2-nitro-2-methylpropyl methacrylate, n-octyl methacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate and tetrahydropyranyl methacrylate.

(B) and (C): The applying to the surface as per step (B) of the present invention's process is effected in the dispersion as per (A), comprising a polyelectrolyte salt dissolved therein, by precipitation to form, around the pigment particle, a sheath of defined thickness usually in the range from 1 to 150 nm, preferably in the range from 1 to 100 nm, more preferably in the range from 5 to 50 nm and most preferably in the range from 10 to 30 nm. Capsule sheath thickness and homogeneity are determined by the precipitation rate of the polyelectrolyte. It depends essentially on the concentration of the pigment particles, the concentration of the coating components and the rate of the precipitation-causing solubility change in the liquid phase.

Precipitation can be effected for example by including a portion of the sheath-forming components as an initial charge in the liquid phase and subsequently adding one or more further sheath components. Such a precipitation step can be used for example for a combination of metal cations and oppositely charged polyelectrolytes.

Another way to effect surface precipitation consists in the components required to form the sheath already being all present in the liquid phase when the liquid phase is changed so as to effect the precipitation. This change to the liquid phase can consist for example in an addition of an electrolyte, as of an inorganic salt for example, or/and pH variation, as in addition of a buffer for example.

A suitable choice of polyelectrolyte makes it possible to adjust the properties and composition of the polyelectrolyte sheath in a defined manner, particularly with regard to surface charge. And the composition of the sheaths can be varied within wide limits through the choice of substances for layer construction. In principle, there are no restrictions with regard to the polyelectrolytes to be used, as long as the molecules used have a sufficiently high charge or/and the ability to form a bond with the layer underneath via other forms of interaction, as for example hydrogen bonds and/or hydrophobic interactions.

It is particularly surprising that step (B), (C) and if appropriate (D) can be carried out particularly efficiently and agglomerate-free in the presence of nonionic surfactants.

The inventors further found that steps (C) and (D) can be optimized through a controlled surface precipitation such that a plurality of polyelectrolyte layers can be applied to the pigment particles in succession without intervening isolation. This can be accomplished by successive addition of the sheath components and causing the precipitation by changing the electrolyte concentration and/or the pH. In the process, polyelectrolyte layers are applied to pigment particles that are comparable in terms of their protective and stabilizing effect with those due to a layer-by-layer technique.

Linear or branched polyelectrolytes can be used. The use of branched polyelectrolytes can lead to less compact polyelectrolyte films having a higher degree of porosity. To enhance capsule stability, polyelectrolyte molecules can be crosslinked within or/and between individual layers, for example by crosslinking amino groups with aldehydes. It is further possible to use amphiphilic polyelectrolytes, for example amphiphilic block or random copolymers of partial polyelectrolyte character, to reduce permeability to polar small molecules. Such amphiphilic copolymers consist of units differing in functionality, for example acidic or basic units on the one hand and, on the other, hydrophobic units such as styrenes, dienes or siloxanes, which can be arranged as blocks or randomly over the polymer. Using copolymers that undergo structural changes as a function of external conditions makes it possible to control capsule walls in a defined manner with regard to their surface charge or other properties. Suitable materials here include for example weak polyelectrolytes, polyampholytes or copolymers having a poly(N-isopropylacrylamide) fraction, for example poly(N-isopropylacrylamide-acrylic acid), whose water solubility changes as a function of the temperature via the equilibrium of hydrogen bonds, which is associated with swelling.

One preferred embodiment comprises encapsulating with a complex of a low molecular weight ion and an oppositely charged polyelectrolyte. Examples of suitable low molecular weight ions are multivalent metal cations, such as alkaline earth metal cations and transition metal cations, inorganic anions, such as sulfate, carbonate, phosphate, charged surfactants, charged lipids and charged oligomers in combination with an appropriately oppositely charged polyelectrolyte. This creates a distributed source for one polyelectrolyte in the simultaneous presence of the other polyelectrolyte. The polyelectrolyte of the complex can be not only the polycation but also the polyanion. The choice depends on the nature of the pigment used and on the desired surface properties. This embodiment comprises adding for example a positively charged polyelectrolyte with a multiply negatively low molecular weight anion, for example a sulfate, to a solution of the negatively charged polyelectrolyte and a dispersion of the pigment, and coating of the pigment particles takes place. The coated pigment particles can be separated for example from the free complexes by centrifugation, filtration and subsequent washing or membrane filtration.

Yet another preferred embodiment comprises surface precipitation in a pigment dispersion comprising soluble, partially destabilized polyelectrolyte complexes (polycation/polyanion) by salt addition or/and pH variation and/or other destabilizing factors. In the process, a gradual transfer of polyelectrolytes takes place from the complexes to the pigment surface. To this end, the negatively and positively charged polyelectrolytes can be introduced into a aqueous solution having a high salt content, preferably a salt content of more than 0.5 Mol/l, for example 1 M NaCl, before stirring. On addition of the pigment particles, these become coated and can subsequently be recovered for example by centrifugation or filtration and subsequent washing.

In yet a further preferred embodiment the sheath comprises metal cations and at least one negatively charged polyelectrolyte. Useful metal cations include for example divalent metal cations and particularly trivalent metal cations. Examples of suitable metal cations are alkaline earth metal cations, transition metal cations and rare earth element cations, such as for example $Ca^{2+}$, $Mg^{2+}$, $Al^{3+}$, $Y^{3+}$, $Tb^{3+}$ and $Fe^{3+}$.

The present invention also provides coated particles having a core which is an organic pigment having a median particle size $d_{50}$ of below 200 nm, and at least two polyelectrolyte layers of differing charge in a layer thickness of 1 to 150 nm, preferably 1 to 100 nm, more preferably 5 to 50 nm and most preferably 10 to 30 nm, each.

Preferably, the coated particles of the present invention comprise
(a.) 20% to 99%, more preferably 50% to 99% by weight and especially 70% to 99% by weight of a core consisting of an organic pigment,
(b.) 1% to 80%, more preferably 1% to 50% by weight and especially 1% to 30% by weight of at least two polyelectrolyte layers, and
(c.) 0% to 30%, preferably 0% to 10% by weight, for example 1% to 20% by weight, of a multivalent, low molecular weight ion.

Useful organic pigments include monoazo, disazo, laked azo, β-naphthol, naphthol AS, benzimidazolone, condensed disazo, azo metal complex pigments and polycyclic pigments such as the phthalocyanine, quinacridone, perylene, perinone, thioindigo, anthanthrone, anthraquinone, flavanthrone, indanthrone, isoviolanthrone, pyranthrone, dioxazine, quinophthalone, isoindolinone, isoindoline and diketopyrrolopyrrole pigments or carbon blacks.

Of the organic pigments mentioned, those having a blue scale lightfastness of better than 5 and particularly better than 6 are particularly suitable. In addition, the pigments used to produce the preparations should be very finely divided. The median particle size $d_{50}$ is ideally below 200 nm, in particular between 30 nm and less than 200 nm and more preferably between 40 and 180 nm.

An illustrative selection of particularly preferred organic pigments are carbon black pigments, for example gas or furnace blacks; monoazo and disazo pigments, in particular the Colour Index pigments Pigment Yellow 1, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 81, Pigment Yellow 83, Pigment Yellow 87, Pigment Yellow 97, Pigment Yellow 111, Pigment Yellow 126, Pigment Yellow 127, Pigment Yellow 128, Pigment Yellow 155, Pigment Yellow 174, Pigment Yellow 176, Pigment Yellow 191, Pigment Red 38, Pigment Red 144, Pigment Red 214, Pigment Red 242, Pigment Red 262, Pigment Red 266, Pigment Red 269, Pigment Red 274, Pigment Orange 13, Pigment Orange 34 or Pigment Brown 41; β-naphthol and naphthol AS pigments, in particular the Colour Index pigments Pigment Red 2, Pigment Red 3, Pigment Red 4, Pigment Red 5, Pigment Red 9, Pigment Red 12, Pigment Red 14, Pigment Red 53:1, Pigment Red 112, Pigment Red 146, Pigment Red 147, Pigment Red 170, Pigment Red 184, Pigment Red 187, Pigment Red 188, Pigment Red 210, Pigment Red 247, Pigment Red 253, Pigment Red 256, Pigment Orange 5, Pigment Orange 38 or Pigment Brown 1; laked azo and metal complex pigments, in particular the Colour Index pigments Pigment Red 48:2, Pigment Red 48:3, Pigment Red 48:4, Pigment Red 57:1, Pigment Red 257, Pigment Orange 68 or Pigment Orange 70; benzimidazoline pigments, in particular the Colour Index pigments Pigment Yellow 120, Pigment Yellow 151, Pigment Yellow 154, Pigment Yellow 175, Pigment Yellow 180, Pigment Yellow 181, Pigment Yellow 194, Pigment Red 175, Pigment Red 176, Pigment Red 185, Pigment Red 208, Pigment Violet 32, Pigment Orange 36, Pigment Orange 62, Pigment Orange 72 or Pigment Brown 25; isoindolinone and isoindoline pigments, in particular the Colour Index pigments Pigment Yellow 139 or Pigment Yellow 173; phthalocyanine pigments, in particular the Colour Index pigments Pigment Blue 15, Pigment Blue 15:1, Pigment Blue 15:2, Pigment Blue 15:3, Pigment Blue 15:4, Pigment Blue 16, Pigment Green 7 or Pigment Green 36; anthanthrone, anthraquinone, quinacridone, dioxazine, indanthrone, perylene, perinone and thioindigo pigments, in particular the Colour Index pigments Pigment Yellow 196, Pigment Red 122, Pigment Red 149, Pigment Red 168, Pigment Red 177, Pigment Red 179, Pigment Red 181, Pigment Red 207, Pigment Red 209, Pigment Red 263, Pigment Blue 60, Pigment Violet 19, Pigment Violet 23, Pigment Blue 80 or Pigment Orange 43; triarylcarbonium pigments, in particular the Colour Index pigments Pigment Red 169, Pigment Blue 56 or Pigment Blue 61; diketopyrrolopyrrole pigments, in particular the Colour Index pigments Pigment Red 254.

Useful polyelectrolytes for the purposes of the present invention include both polyanions and polybases, and are not only biopolymers, for example alginic acid, gum arabic, nucleic acids, pectins, proteins and others, but also chemically modified biopolymers, for example ionic or ionizable polysaccharides, for example carboxymethylcellulose, chitosan and chitosan sulfate, ligninsulfonates and also synthetic polymers, for example polymethacrylic acid, polyvinylsulfonic acid, polyvinylphosphonic acid and polyethyleneimine.

Suitable polyanions comprise naturally occurring polyanions and synthetic polyanions. Examples of naturally occurring polyanions are alginate, carboxymethylamylose, carboxymethylcellulose, carboxymethyldextran, carageenan, cellulose sulfate, chondroitin sulfate, chitosan sulfate, dextran sulfate, gum arabic, guar gum, gellan gum, heparin, hyaluronic acid, pectin, xanthan and proteins at an appropriate pH. Examples of synthetic polyanions are polyacrylates (salts of polyacrylic acid), anions of polyamino acids and their copolymers, polymaleate, polymethacrylate, polystyrene sulfate, polystyrene sulfonate, polyvinyl phosphate, polyvinyl phosphonate, polyvinyl sulfate, polyacrylamidomethylpropane sulfonate, polylactate, poly(butadiene/maleate), poly(ethylene/maleate), poly(ethacrylate/acrylate) and poly(glyceryl methacrylate).

Suitable polybases comprise naturally occurring polycations and synthetic polycations. Examples of suitable naturally occurring polycations are chitosan, modified dextrans, for example diethylaminoethyl-modified dextrans, hydroxymethylcellulosetrimethylamine, lysozyme, polylysine, protamine sulfate, hydroxyethylcellulosetrimethylamine and proteins at an appropriate pH. Examples of synthetic polycations are polyallylamine, polyallylamine hydrochloride, polyamines, polyvinylbenzyltrimethylammonium chloride, polybrene, polydiallyl-dimethylammonium chloride, polyethyleneimine, polyimidazoline, polyvinylamine, polyvinylpyridine, poly(acrylamide/methacryloxypropyltrimethylammonium bromide), poly(diallyldimethylammonium chloride/N-isopropylacrylamide), poly(dimethylaminoethyl acrylate/acrylamide), polydimethylaminoethyl methacrylate, polydimethylaminoepichlorohydrin, polyethyleneiminoepichlorohydrin, polymethacryloyloxyethyltrimethylammonium bromide, hydroxypropylmethacryloyloxyethyldimethylammonium chloride, poly(methyldiethylaminoethyl methacrylate/acrylamide), poly(methyl/guanidine), polymethylvinylpyridinium bromide, poly(vinylpyrrolidone-dimethylaminoethyl methacrylate) and polyvinylmethylpyridinium bromide.

The present invention further provides for the use of the coated particles as a colorant for liquid printing inks, in particular for ink jet inks, electrophotographic toners, in particular addition polymerization toners, coatings, powder coatings and color filters.

The polyelectrolyte-encapsulated pigments of the present invention can be used either in isolated form or in dispersion. The dispersion is advantageously produced with resulting pigment contents of at least 8% by weight and preferably at least 10% by weight in order that these dispersions may be used directly for ink formulation. After the encapsulating step, every subsidiary step (B), (C) or (D) may be followed by a removal of low molecular weight compounds or non-enveloping polyelectrolytes. This is advantageously accomplished by membrane filtration of the dispersion or by isolating the pigment by centrifugation or filtration and subsequent washing.

The polyelectrolyte-encapsulated pigments of the present invention are notable for high stability. Many pigments when used in the ink jet process promote nozzle clogging, and that leads to poor printing behavior. Such a failure of individual nozzles is not observed when the polyelectrolyte-encapsulated pigments of the present invention are used, making streak-free and hence uniform printing possible.

The polyelectrolyte-encapsulated pigments of the present invention are preferably used as a colorant in ink jet inks on an aqueous and nonaqueous basis, in microemulsion inks and also in such inks of the hot melt type.

Microemulsion inks are based on organic solvents, water and if appropriate an additional hydrotropic substance (compatibilizer). Microemulsion inks generally contain 0.5% to 30% by weight and preferably 1% to 15% by weight of the polyelectrolyte-encapsulated pigments of the present invention, 5% to 99% by weight of water and 0.5% to 94.5% by weight of organic solvent and/or hydrotropic compound.

Solvent-based ink jet inks preferably contain 0.5% to 30% by weight of the polyelectrolyte-encapsulated pigments of the present invention, 85% to 99.5% by weight of organic solvent and/or hydrotropic compounds.

Hot melt inks are usually based on waxes, fatty acids, fatty alcohols or sulfonamides that are solid at room temperature and become liquid on heating, the preferred melting range being between about 60° C. and about 140° C. Hot melt ink jet inks consist for example essentially of 20% to 90% by weight of wax and 1% to 10% by weight of the polyelectrolyte-encapsulated pigments of the present invention. Hot melt ink jet inks may further contain 0% to 20% by weight of an additional polymer, up to 5% by weight of dispersing assistant, 0% to 20% by weight of viscosity modifier, 0% to 20% by weight of plasticizer, 0% to 10% by weight of tackifying additive, 0% to 10% by weight of transparency stabilizer (prevents crystallization of waxes for example) and also 0% to 2% by weight of antioxidant.

In ink jet inks, the polyelectrolyte-encapsulated pigments can also be shaded with other colorants such as for example organic or inorganic pigments and/or dyes. In this case, they are used in ink sets consisting of yellow, magenta, cyan and black inks containing pigments and/or dyes as colorants. They can further be used in ink sets which additionally contain one or more "spot colors" in, for example, orange, green, blue, golden and silver.

Preference is given to a set of liquid printing inks whose black formulation preferably contains carbon black as colorant, in particular a gas or furnace black; whose cyan formulation preferably contains a pigment from the group of the phthalocyanine, indanthrone or triarylcarbonium pigments, in particular the Colour Index pigments Pigment Blue 15, Pigment Blue 15:1, Pigment Blue 15:2, Pigment Blue 15:3, Pigment Blue 15:4, Pigment Blue 16, Pigment Blue 56, Pigment Blue 60 or Pigment Blue 61; whose magenta formulation preferably contains a pigment from the group of the monoazo, disazo, β-naphthol, naphthol AS, laked azo, metal complex, benzimidazolone, anthanthrone, anthraquinone, quinacridone, dioxazine, perylene, thioindigo, triarylcarbonium or diketopyrrolopyrrole pigments, in particular the Colour Index pigments Pigment Red 2, Pigment Red 3, Pigment Red 4, Pigment Red 5, Pigment Red 9, Pigment Red 12, Pigment Red 14, Pigment Red 38, Pigment Red 48:2, Pigment Red 48:3, Pigment Red 48:4, Pigment Red 53:1, Pigment Red 57:1, Pigment Red 112, Pigment Red 122, Pigment Red 144, Pigment Red 146, Pigment Red 147, Pigment Red 149, Pigment Red 168, Pigment Red 169, Pigment Red 170, Pigment Red 175, Pigment Red 176, Pigment Red 177, Pigment Red 179, Pigment Red 181, Pigment Red 184, Pigment Red 185, Pigment Red 187, Pigment Red 188, Pigment Red 207, Pigment Red 208, Pigment Red 209, Pigment Red 210, Pigment Red 214, Pigment Red 242, Pigment Red 247, Pigment Red 253, Pigment Red 254, Pigment Red 255, Pigment Red 256, Pigment Red 257, Pigment Red 262, Pigment Red 263, Pigment Red 264, Pigment Red 266, Pigment Red 269, Pigment Red 270, Pigment Red 272, Pigment Red 274, Pigment Violet 19, Pigment Violet 23 or Pigment Violet 32; whose yellow formulation preferably contains a pigment from the group of the monoazo, disazo, benzimidazoline, isoindolinone, isoindoline or perinone pigments, in particular the Colour Index pigments Pigment Yellow 1, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 81, Pigment Yellow 83, Pigment Yellow 87, Pigment Yellow 97, Pigment Yellow 111, Pigment Yellow 120, Pigment Yellow 126, Pigment Yellow 127, Pigment Yellow 128, Pigment Yellow 139, Pigment Yellow 151, Pigment Yellow 154, Pigment Yellow 155, Pigment Yellow 173, Pigment Yellow 174, Pigment Yellow 175, Pigment Yellow 176, Pigment Yellow 180, Pigment Yellow 181, Pigment Yellow 191, Pigment Yellow 194, Pigment Yellow 196, Pigment Yellow 213 or Pigment Yellow 219; whose orange formulation preferably contains a pigment from the group of the disazo, β-naphthol, naphthol AS, benzimidazolone or perinone pigments, in particular the Colour Index pigments Pigment Orange 5, Pigment Orange 13, Pigment Orange 34, Pigment Orange 36, Pigment Orange 38, Pigment Orange 43, Pigment Orange 62, Pigment Orange 68, Pigment Orange 70, Pigment Orange 71, Pigment Orange 72, Pigment Orange 73, Pigment Orange 74 or Pigment Orange 81; whose green formulation preferably contains a pigment from the group of the phthalocyanine pigments, in particular the Colour Index pigments Pigment Green 7 or Pigment Green 36.

The liquid ink sets can additionally contain shading dyes, preferably from the group C.I. Acid Yellow 17 and C.I. Acid Yellow 23; C.I. Direct Yellow 86, C.I. Direct Yellow 98 and C.I. Direct Yellow 132; C.I. Reactive Yellow 37; C.I. Pigment Yellow 17, C.I. Pigment Yellow 74, C.I. Pigment Yellow 83, C.I. Pigment Yellow 97, C.I. Pigment Yellow 120, C.I. Pigment Yellow 139, C.I. Pigment Yellow 151, C.I. Pigment Yellow 155 and C.I. Pigment Yellow 180; C.I. Direct Red 1, C.I. Direct Red 11, C.I. Direct Red 37, C.I. Direct Red 62, C.I. Direct Red 75, C.I. Direct Red 81, C.I. Direct Red 87, C.I. Direct Red 89, C.I. Direct Red 95 and C.I. Direct Red 227; C.I. Acid Red 1, C.I. Acid Red 8, C.I. Acid Red 80, C.I. Acid Red 81, C.I. Acid Red 82, C.I. Acid Red 87, C.I. Acid Red 94, C.I. Acid Red 115, C.I. Acid Red 131, C.I. Acid Red 144, C.I. Acid Red 152, C.I. Acid Red 154, C.I. Acid Red 186, C.I. Acid Red 245, C.I. Acid Red 249 and C.I. Acid Red 289; C.I. Reactive Red 21, C.I. Reactive Red 22, C.I. Reactive Red 23, C.I. Reactive Red 35, C.I. Reactive Red 63, C.I. Reactive Red 106, C.I. Reactive Red 107, C.I. Reactive Red 112, C.I. Reactive Red 113, C.I. Reactive Red 114, C.I. Reactive Red 126, C.I. Reactive Red 127, C.I. Reactive Red 128, C.I. Reactive Red 129, C.I. Reactive Red 130, C.I. Reactive Red 131, C.I. Reactive Red 137, C.I. Reactive Red 160, C.I. Reactive Red 161, C.I. Reactive Red 174 and C.I. Reactive Red 180.

The polyelectrolyte pigments of the present invention are useful for producing liquid inks for use in all conventional ink jet printers, in particular for those based on the bubble jet or piezo process.

As well as for printing paper, natural or synthetic fiber materials, foils or plastics, the polyelectrolyte-encapsulated pigments of the present invention can be used for printing a wide variety of coated or uncoated substrate materials, for example for printing paperboard, cardboard, wood and wood-base materials, metallic materials, semiconductor materials, ceramic materials, glasses, glass fibers and ceramic fibers, inorganic materials of construction, concrete, leather, comestibles, cosmetics, skin and hair. The substrate material may be two-dimensionally planar or spatially expanded, i.e., be three-dimensional, and may be printed or coated completely or only partially.

The polyelectrolyte pigments of the present invention are also useful as colorants in electrophotographic toners and developers, such as for example one or two component powder toners (also known as one- or two-component developers), magnetic toners, liquid toners, addition polymerization toners and also specialty toners. Typical toner binders are addition polymerization, polyaddition and polycondensation resins, such as styrene, styrene-acrylate, styrene-butadiene, acrylate, polyester, phenol-epoxy resins, polysulfones, polyurethanes, individually or combined, and also polyethylene or polypropylene, which may each contain further ingredients, such as charge control agents, waxes or flow assistants, or are subsequently modified with these additions.

The polyelectrolyte-encapsulated pigments of the present invention are further useful as colorants in powders and powder coatings, in particular in triboelectrically or electrokinetically sprayable powder coatings, which are used for surface coating of articles composed for example of metal, wood, plastic, glass, ceramic, concrete, textile material, paper or rubber. The polyelectrolyte-encapsulated pigments of the present invention are further useful as colorants for color filters, not only for additive but also subtractive color generation, as for example in electrooptical systems such as television screens, liquid crystal displays (LCDs), charge coupled devices, plasma displays or electroluminescent displays, which in turn may be active (twisted nematic) or passive (supertwisted nematic) ferroelectric displays or light-emitting diodes, and also as colorants for electronic inks ("e-inks") or electronic paper ("e-paper"). To produce color filters, both reflective and transparent color filters, pigments are applied in the form of a paste or as pigmented photoresists in suitable binders (acrylates, acrylic esters, polyimides, polyvinyl alcohols, epoxides, polyesters, melamines, gelatin, caseins) to the respective LCD components (for example TFT-LCD=Thin Film Transistor Liquid Crystal Displays or for example ((S) TN-LCD=(Super) Twisted Nematic-LCD). As well as a high thermal stability, a stable paste or a pigmented photoresist also has a high pigment purity as a prerequisite. In addition, the pigmented color filters can also be applied by ink jet printing processes or other suitable printing processes.

The polyelectrolyte-encapsulated pigments of the present invention are also useful for pigmentation of painting and dispersion colors, emulsion paints, for printing inks or colors, for example textile printing colors, flexographic printing inks, decorative printing inks or gravure printing inks, for wallpaper colors or inks, for water-thinnable coatings, for wood preservation systems, for viscose solution dyeing, for lacquers, for sausage casings, for seed, for glass bottles, for mass coloration of roof tiles, for plasters, for wood stains, for colored pencil leads, felt tip pens, artists' inks, pastes for ballpoint pens, chalks, washing and cleaning compositions, shoe care products, coloration of latex products, abrasives and also for coloration of plastics and macromolecular materials.

In the examples which follow, percentages and parts are by weight, unless otherwise stated.

An essential feature of the examples hereinbelow is that a nonionic surfactant is applied during coating. This makes it possible to keep particle size growth by aggregation in the course of coating under check, so that the polyelectrolyte-encapsulated pigments formed have a particle size, surface charge and dispersion stability suitable for application.

Production of Polyelectrolyte-Encapsulated Pigments Using Layer-by-Layer Technology Example 1

Coatings of C.I. Pigment Blue 15:3 Starting with a Cationic Layer

Example 1a

Production of Pigment Dispersion

A mixture of 50 parts of C.I. Pigment Blue 15:3, 13.5 parts of an ethylene oxide-propylene oxide copolymer (Pluronic™ F68, BASF), 1 part of sodium dodecylsulfate and 435.5 parts of demineralized water are predispersed using an Ultra-Turrax™ and subsequently dispersed with a high pressure homogenizer until the particle size distribution is constant.

Example 1b

Coating with a Cationic Layer of Polyallylamine Hydrochloride (PAH)

To the pigment dispersion obtained from Example 1a are added 2000 parts of a 1.0% solution of PAH (15 000 g/mol, 0.05M acetate buffer pH 5.6, 0.2M NaCl) and the mixture is stirred at room temperature for 20 min. The coated pigment particles are subsequently removed by centrifugation and washed twice with 500 parts of demineralized water.

Example 1c

Coating with a Cationic Layer of Polydiallyldimethylammonium Chloride (PDADMAC)

The pigment dispersion obtained from Example 1a is admixed with 2000 parts of a surfactant-containing 1.0% by weight PDADMAC solution (0.1% by weight of Pluronic™ F68, 0.05M acetate buffer pH 5.6, 0.2M NaCl) and stirred at room temperature for 20 min. The coated pigment particles are subsequently removed by centrifugation and washed twice with 500 parts of demineralized water.

Example 1d

Coating with an Anionic Layer of Polystyrenesulfonic Acid (PSS)

The pigment preparation obtained from Example 1b is dispersed in 440 parts of demineralized water and admixed with 2000 parts of a surfactant-containing 0.5% by weight polystyrenesulfonic acid solution (70 000 g/mol, 0.1% by weight of Pluronic™ F68, 0.05M acetate buffer pH 5.6, 0.2M NaCl) and stirred at room temperature for 20 min. The coated pigment particles are subsequently removed by centrifugation and washed twice with 500 parts of demineralized water.

Example 1e

Coating with an Anionic Layer of Polystyrenesulfonic Acid (PSS)

The pigment preparation obtained from Example 1c is dispersed in 440 parts of demineralized water and admixed with 2000 parts of a surfactant-containing 0.5% by weight polystyrenesulfonic acid solution (70 000 g/mol, 0.1% by weight of Pluronic™ F68, 0.05M acetate buffer pH 5.6, 0.2M NaCl) and stirred at room temperature for 20 min. The coated pigment particles are subsequently removed by centrifugation and washed twice with 500 parts of demineralized water.

Example 1f

Coating with a Cationic Layer of PAH

The pigment preparation obtained from Example 1d is admixed with 2000 parts of a surfactant-containing 1.0% by weight PAH solution (15 000 g/mol, 0.1% by weight of Pluronic™ F68, 0.05M acetate buffer pH 5.6, 0.2M NaCl) and stirred at room temperature for 20 min. The coated pigment particles are subsequently removed by centrifugation and washed twice with 500 parts of demineralized water.

Example 1g

(Comparison): Coating with a Cationic Layer of Polydiallyldimethylammonium Chloride (PDADMAC)

The pigment dispersion obtained from Example 1e is admixed with 2000 parts of a 1.0% by weight PDADMAC solution (0.05M acetate buffer pH 5.6, 0.2M NaCl) and stirred at room temperature for 20 min. The coated pigment particles are subsequently removed by centrifugation and washed twice with 500 parts of demineralized water.

TABLE 1

Dispersions of one part of (encapsulated) C.I. Pigment Blue 15:3 in 9 parts of demineralized water

|  | Zeta potential (mV) | Particle size $d_{50}$ (by PCS in nm) |
|---|---|---|
| Example 1a | −54 | 164 |
| Example 1b | +32 | 254 |
| Example 1c | +22 | 403 |
| Example 1d | −47 | 287 |
| Example 1e | −48 | 298 |
| Example 1f | +40 | 285 |
| Example 1g | +41 | 2832 |

PCS=photon correlation spectroscopy

Table 1 shows that the layer-by-layer encapsulation of C.I. Pigment Blue 15:3 has a strong influence on the zeta potential and hence the surface charge. It is thus possible to set specific values over a wide range. Without nonionic surfactant, 10 times larger particles are formed (Example 1g).

Example 2

Two Layer Encapsulation of C.I. Pigment Yellow 213 Starting with a Cationic Layer

Example 2a

Production of Pigment Dispersion

A mixture of 50 parts of C.I. Pigment Yellow 213, 13.5 parts of Pluronic™ F68, 1 part of sodium dodecylsulfate and 435.5 parts of demineralized water are predispersed using an Ultra-Turrax™ and subsequently dispersed with a high pressure homogenizer until the particle size distribution is constant.

Example 2b

Coating with a Cationic Polyelectrolyte Layer of Polyallylamine Hydrochloride (PAH)

To the pigment dispersion obtained from Example 2a are added 2000 parts of a 1.0% by weight solution of PAH (15 000 g/mol, 0.05M acetate buffer pH 5.6, 0.2M NaCl) and the mixture is stirred at room temperature for 20 min. The coated pigment particles are subsequently removed by centrifugation and washed twice with 500 parts of demineralized water.

Example 2c

Coating with a Cationic Polyelectrolyte Layer of Eudragit E

To the pigment dispersion obtained from Example 2a are added 2000 parts of a 0.1% by weight acrylate copolymer (Eudragit E) solution (0.1% of Pluronic™ F68, 0.2M NaCl, pH 4.6) and the mixture is stirred at room temperature for 20 min. The coated pigment particles are subsequently removed by centrifugation and washed twice with 500 parts of demineralized water.

Example 2d

Coating with an Anionic Layer of Polystyrenesulfonic Acid (PSS)

The pigment preparation obtained from Example 2b is dispersed in 440 parts of demineralized water and admixed with 2000 parts of a surfactant-containing 0.5% by weight polystyrenesulfonic acid solution (70 000 g/mol, 0.1% by weight of Pluronic™ F68, 0.05M acetate buffer pH 5.6, 0.2M NaCl) and stirred at room temperature for 20 min. The coated pigment particles are subsequently removed by centrifugation and washed twice with 500 parts of demineralized water.

Example 2e

Coating with an Anionic Layer of Polystyrenesulfonic Acid (PSS)

The pigment preparation obtained from Example 2c is dispersed in 440 parts of demineralized water and admixed with 2000 parts of a surfactant-containing 0.5% by weight polystyrenesulfonic acid solution (70 000 g/mol, 0.1% by weight of Pluronic™ F68, 0.05M acetate buffer pH 5.6, 0.2M NaCl) and stirred at room temperature for 20 min. The coated pigment particles are subsequently removed by centrifugation and washed twice with 500 parts of demineralized water.

TABLE 2

Dispersions of one part of (encapsulated) C.I. Pigment Yellow 213 in 9 parts of demineralized water

|  | Zeta potential (mV) | Particle size $d_{50}$ by PCS (nm) |
|---|---|---|
| Example 2a | −60 | 146 |
| Example 2b | +45 | 184 |
| Example 2c | +25 | 229 |
| Example 2d | −46 | 255 |
| Example 2e | −52 | 293 |

PCS=photon correlation spectroscopy

Table 2 shows that the layer-by-layer encapsulation of C.I. Pigment Yellow 213 has a strong influence on the zeta potential and hence the surface charge. It is thus possible to set specific values over a wide range.

Example 3

Polyelectrolyte Coating of C.I. Pigment Blue 15:3 Starting with an Anionic Polyelectrolyte Layer Example 3a Coating with an Anionic Layer of Polystyrenesulfonic Acid (PSS)

To the pigment dispersion obtained from Example 1a are added 2000 parts of a surfactant-containing 0.1% by weight PSS polyelectrolyte solution (70 000 g/mol, 0.05M acetate buffer pH 5.6, 0.2M NaCl) and the mixture is stirred at room temperature for 20 min. The coated pigment particles are subsequently removed by centrifugation and washed twice with 500 parts of demineralized water.

Example 3b

Coating with a Cationic Polyelectrolyte Layer of Eudragit E

The pigment preparation obtained from Example 3a is dispersed in 440 parts of demineralized water and admixed with 2000 parts of a 0.1% by weight Eudragit E solution (pH 4.7, 0.2M NaCl) and with 0.1% by weight of Pluronic™ F68 and the mixture is stirred at room temperature for 20 min. The coated pigment particles are subsequently removed by centrifugation and washed twice with 500 parts of demineralized water.

TABLE 3

Dispersions of one part of (encapsulated) C.I. Pigment Blue 15:3 in 9 parts of demineralized water

|  | Zeta potential (mV) | Particle size $d_{50}$ by PCS (nm) |
|---|---|---|
| Example 1a | −54 | 164 |
| Example 3a | −49 | 222 |
| Example 3b | +20.5 | 320 |

Table 3 shows that the layer-by-layer encapsulation of C.I. Pigment Blue 15:3 has a strong influence on the zeta potential and hence the surface charge. It is thus possible to set specific values over a wide range.

Evaluation of Performance Characteristics of Inventive Pigment Preparations

Production of Dispersions for Ink Jet Printing

Use Example 1

Pigment Dispersion of C.I. Pigment Blue 15:3

A dispersion is obtained by dispersing a pigment preparation according to Example 1e in deionized water containing 10.5% by weight of C.I. Pigment Blue 15:3.

Use Example 2

Pigment Dispersion of C.I. Pigment Yellow 213

A dispersion is obtained by dispersing a pigment preparation according to Example 2e in deionized water containing 9.2% by weight of C.I. Pigment Yellow 213.

Comparative Examples

In the examples which follow, the pigment is pasted up in demineralized water together with the dispersants specified below, the organic solvent and the other additions, and then predispersed with a dissolver. Subsequent fine dispersion is effected by bead milling for 2 hours with cooling. The dispersion is subsequently adjusted with demineralized water to the desired pigment end concentration of 20%, 100 parts by weight of the respective dispersion being produced.

Comparative Example 1

Pigment dispersion based on styrene acrylate and C.I. Pigment Blue 15:3, nonencapsulated:

20 parts of C.I. Pigment Blue 15:3
2.5 parts of acrylic resin, sodium salt (dispersant)
1.2 parts of polyethylene glycol alkyl ether, Na salt (dispersant)
1 part of wetting agent
25 parts of glycol
0.2 part of preservative
balance water

Comparative Example 2

Pigment Dispersion Based on Anionic Surfactant and C.I. Pigment Yellow 213, Nonencapsulated

| | |
|---|---|
| 20 parts | of C.I. Pigment Yellow 213 |
| 2 parts | of anionic surfactant (dispersant) |
| 2 parts | of Disperbyk ™ 190 dispersant |
| 5 parts | of glycol |
| 0.2 part | of preservative |
| balance | water |

Testing The Printing Properties of Pigment Preparations
Production of Test Inks:

To evaluate the printing properties, test inks were produced from the dispersions of Use Examples 1 and Comparative Examples 1 and 2 and tested for printability on a thermal ink jet printer.

To produce the test inks, the dispersions were initially finely filtered through a 1 μm filter to remove grinding media attritus and any coarse fractions. Thereafter, the filtered dispersions were diluted with water and admixed with further low molecular weight alcohols and polyols to adjust the pigment content to 5% by weight based on the ink (100% by weight).

Viscosity:

Effective ink jet inks have to meet a number of physical requirements. They have to have a very low viscosity (preferably <5 mPas) to avoid printer nozzle clogging and produce a uniform printed image.

Viscosity was determined using a cone-plate viscometer (RS 1) from Haake (titanium cone: Ø 60 mm, 1°). The viscosity values reported in Table 4 were measured at a shear rate of 60 s$^{-1}$.

A Hewlett Packard 960c printer was used to print test images on commercially available normal papers (copy papers) and specialty papers (Premium Quality). Quality and goodness of printed image were assessed by visual inspection.

Assessment of Optical Density:

To assess optical density, test inks were uniformly printed with an HP 960c printer onto plain paper from DataCopy and the optical density was measured by means of a spectrophotometer from Gretag MacBeth. The results are collated in Table 4.

TABLE 4

Viscosities and optical densities of test inks

| | Test ink viscosity | Optical density |
|---|---|---|
| Use Example 1 | 2.9 mPas | 1.12 |
| Use Example 2 | 2.4 mPas | 1.22 |
| Comparative Example 1 | 4.9 mPas | 0.99 |
| Comparative Example 2 | 4.3 mPas | 1.12 |

The test inks produced from the dispersions of Use Examples 1 and 2 have a very low viscosity, improved over Comparative Examples 1 and 2, and exhibit very good print behavior. More particularly, they give high reliability in the printing operation (very good start-of-print, no nozzle clogging and a very uniform printed image of excellent quality on the various papers used. Prints on plain paper of the test inks produced as per Use Examples 1 and 2 have a higher optical density compared with the test inks of Comparative Examples 1 and 2. In addition, the prints of Use Examples 1 and 2 have a streak-free printed image, in contradistinction to those of Comparative Examples 1 and 2.

The test inks produced as per Use Examples 1 and 2 thus meet ink jet printing requirements in an excellent manner.

We claim:

1. A process for encapsulating pigment particles comprising the steps of:
   (A) producing a dispersion of the pigment to be encapsulated,
   (B) applying a polyelectrolyte layer to the surface of the pigment particles,
   (C) applying at least one polyelectrolyte layer having opposite charge to the pigment particles formed in step (B), or adding low molecular weight, multivalent ions oppositely charged to the pigment particles formed in step (B), or both and
   (D) optionally repeating steps (B) and (C),
said steps (B), (C) and optionally step (D) being carried out in the presence of a nonionic surfactant and wherein the encapsulated pigment particles contain
   (a.) 20% to 99% by weight of the pigment,
   (b.) 1% to 80% by weight of the polyelectrolyte layers of steps (B) and (C), and
   (c.) 0% to 30% by weight of the multivalent, low molecular weight ions.

2. The process as claimed in claim 1 wherein at east two polyelectrolyte layers of opposite charge are applied.

3. The process as claimed in claim 2 wherein the at east two polyelectrolyte layers are applied by a layer-by-layer technique.

4. The process as claimed in claim 2 wherein the at least two polyelectrolyte layers are applied to the pigment particles in succession without intervening isolation.

5. The process as claimed in claim 1, wherein the at least one polyelectrolyte layer is applied by precipitation onto the surface of the pigment particles.

6. The process as claimed in claim 5 wherein the precipitation is effected by destabilization of polyelectrolyte complexes.

7. The process as claimed in claim 6, wherein the destabilization of the polyelectrolyte complexes is effected by changing the polyelectrolyte concentration, the pH or both.

* * * * *